(12) United States Patent
Cucerzan et al.

(10) Patent No.: US 7,895,193 B2
(45) Date of Patent: Feb. 22, 2011

(54) ARBITRATION OF SPECIALIZED CONTENT USING SEARCH RESULTS

(75) Inventors: Silviu-Petru Cucerzan, Redmond, WA (US); Jamie P. Buckley, Redmond, WA (US); Laura J. Baldwin, Seattle, WA (US); Randall F. Kern, Seattle, WA (US); Eric D. Brill, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 521 days.

(21) Appl. No.: 11/239,891

(22) Filed: Sep. 30, 2005

(65) Prior Publication Data

US 2007/0078822 A1    Apr. 5, 2007

(51) Int. Cl.
*G06F 7/00* (2006.01)
*G06F 17/30* (2006.01)

(52) U.S. Cl. .................. 707/721; 707/722; 707/728; 707/732

(58) Field of Classification Search .............. 707/3, 707/721, 722, 728, 732
See application file for complete search history.

(56) References Cited

U.S. PATENT DOCUMENTS

| | | | |
|---|---|---|---|
| 5,771,378 A * | 6/1998 | Holt et al. | 707/5 |
| 6,134,532 A * | 10/2000 | Lazarus et al. | 705/14 |
| 6,327,590 B1 * | 12/2001 | Chidlovskii et al. | 707/5 |
| 6,701,310 B1 * | 3/2004 | Sugiura et al. | 707/5 |
| 6,789,073 B1 * | 9/2004 | Lunenfeld | 707/3 |
| 6,842,730 B1 * | 1/2005 | Ejerhed et al. | 704/9 |
| 7,058,626 B1 * | 6/2006 | Pan et al. | 707/4 |
| 7,418,447 B2 * | 8/2008 | Caldwell et al. | 707/100 |
| 2002/0103788 A1 * | 8/2002 | Donaldson et al. | 707/3 |
| 2004/0002959 A1 * | 1/2004 | Alpert et al. | 707/3 |
| 2004/0100510 A1 * | 5/2004 | Milic-Frayling et al. | 345/864 |
| 2004/0117363 A1 * | 6/2004 | Ohno | 707/3 |
| 2004/0199496 A1 * | 10/2004 | Liu et al. | 707/3 |
| 2005/0102282 A1 * | 5/2005 | Linden | 707/3 |
| 2006/0074853 A1 * | 4/2006 | Liu et al. | 707/1 |

\* cited by examiner

*Primary Examiner*—Etienne P LeRoux
*Assistant Examiner*—Jared M Bibbee
(74) *Attorney, Agent, or Firm*—Shook, Hardy & Bacon L.L.P.

(57) ABSTRACT

The claimed subject matter provides systems and methods that facilitate providing specialized content associated with web results in response to a user query to provide queried information directly to a user without requiring the user to select a link and/or scroll through information on a web page associated therewith. Reference language models can be generated from multiple queries and can be compared to a query language model generated from web results returned in response to a user query. Based on such comparison, a determination can be made regarding whether a particular portion of specialized content corresponding to some particular query keywords is relevant enough to warrant direct presentation to the user.

16 Claims, 15 Drawing Sheets

FIG. 11

ARBITRATION OF SPECIALIZED CONTENT USING SEARCH RESULTS

BACKGROUND

The World Wide Web has become a popular reference tool due to its vast amount of available information. Typically, the information available on web sites and servers is accessed utilizing a web browser that executes on a computer. In some instances, a user knows the name of a site or server or a Uniform Resource Locator (URL) associated with the site or server that the user desires to access. In such situations, a user can launch a web browser and access the web site by entering a URL associated with the web site into an address bar of the web browser and pressing the enter key on the keyboard or clicking a button with a mouse.

However, in most instances, the user does not know a URL or a site name that contains data that answers the user's informational need. In many of those cases, the user does not even know that such a site exists. To find the site or the URL of the site, the user employs a search function to facilitate locating a particular site based on keywords. The user can utilize a search engine to find information stored on computer system(s) such as the World Wide Web or a personal computer. The search engine enables the user to locate content meeting specific criteria (e.g., containing a given word, portion of a word, phrase, . . . ) and retrieves a list of references that match those criteria. The search engine, for example, can display links to web pages that are relevant to a user's query as well as snippets, which are contextual descriptions, associated with the web pages.

The user can enter keywords into a search engine, which will search the World Wide Web and return sites that the search engine determines to be related to the keywords. The search engine displays links and snippets (e.g., contextual descriptions) for web pages that are relevant to the user keywords. However, the user must then select the link to traverse to a particular web page to view the information.

In addition to the web index, a search engine may use specialized content other than Web pages to serve queries from users, including geographic information, sports scores, movie show times, TV guide, weather and stock data. For queries such as "traffic" or "weather", the search engine may present information derived from the specialized data feeds to provide an answer to the user's query in addition to the list of Web page links. Because many of the queries are ambiguous with respect to the user's informational needs, systems and/or methods that facilitate resolving ambiguity in search queries to improve relevance of answers presented to a user in response to such queries are required in the art.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate utilizing search results to arbitrate specialized content. Because many queries are ambiguous, it is not always clear which types of specialized content should be displayed on a page for a given query. For example, the query "traffic" may return information about automobile traffic or the music band called "Traffic." In the first case, specialized content can include the current road traffic conditions in a user's area (e.g., a map of the nearby area encoding the traffic conditions) as well as pointers to relevant web pages. In the second case, content can include a photo of the band, hit songs, top albums, links to trustworthy places that sell songs/albums of the band, etc. Various aspects set forth herein relate to an algorithmic manner of using search results to determine when and what type of specialized content to present to users. Such can be based on an assumption that the web content and link structure reflect, to a large degree, user interests' distribution, and that a web search engine attempts to retrieve for each query a query-relevant snapshot of the web. In other words, if the top web search results for "traffic" contain pages predominantly about the band, the music-specific specialized content can be deemed more relevant to display than information about automobile traffic.

In accordance with one aspect of the claimed subject matter, systems are described that comprise an interface component through which a user can enter a query to a search engine. Each of the interface component and the search engine can be operatively coupled to an arbitration component that generates a query language model from results returned by the search engine in response to the user's query. The arbitration component can compare the query model to pre-generated references models associated with a topic of the query to determine a level of similarity there between. For instance, the reference models can be generated based in part on information related to a number of topic-specific queries and a number of non-specific queries. Words or properties occurring at a high frequency in the search results for topic specific queries relative to the non-specific queries can be weighted to impart a relevance factor thereto with regard to the specific topic. Such weighted properties can then be employed to generate the reference model(s) for that topic (e.g., music, sports, stocks, politics, movies, . . . ). Aggregate model weights can be compared to determine a level of similarity between the query model and a reference model. If such similarity is above a threshold level, then specialized content associated with the topical terms in the query can be directly presented to the user along with the search results themselves. If the threshold constraint is not satisfied, then the web results can be presented to the user without specialized content.

In accordance with another aspect of the claimed subject matter, a method of providing specialized content to a user can comprise generating a query model from results returned for a user's query, and generating at least one reference model for each of a plurality of query topics (e.g., sports, news, music, . . . ). The reference model(s) can have weighted lexical properties that impart a relevance factor for certain keywords over others for a given query topic. The query model can then be compared to a reference model of the same query topic to determine whether the reference model is substantially similar in relevance weight (e.g., according to a threshold relevance criterion). If so, then specialized content from a snippet associated with a web result can be presented directly to the user without requiring the user to click on a link an scroll through a web page associated therewith to access the sought information.

According to a related aspect, a specialized content arbitration system can be personalized to facilitate inferring a desired piece of specialized content. For instance the system can be implicitly personalized based on past user query topics, a user query log, history, and the like. Additionally, and/or alternatively, the system can be explicitly personalized according to input from a user pertaining to preferred topics of interest (e.g., music over politics, . . . ). In either case, similarity thresholds between a query model and a reference model can be relaxed for preferred query topics and/or increased for non-preferred query topics to further tune the system to the users preferences when determining whether to display specialized content and/or what specific content to display.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

FIG. 11 is an illustration of a screenshot depicting information related to arbitration results for queries containing specific terms, in accordance with one or more aspects.

DETAILED DESCRIPTION

Figure 1:
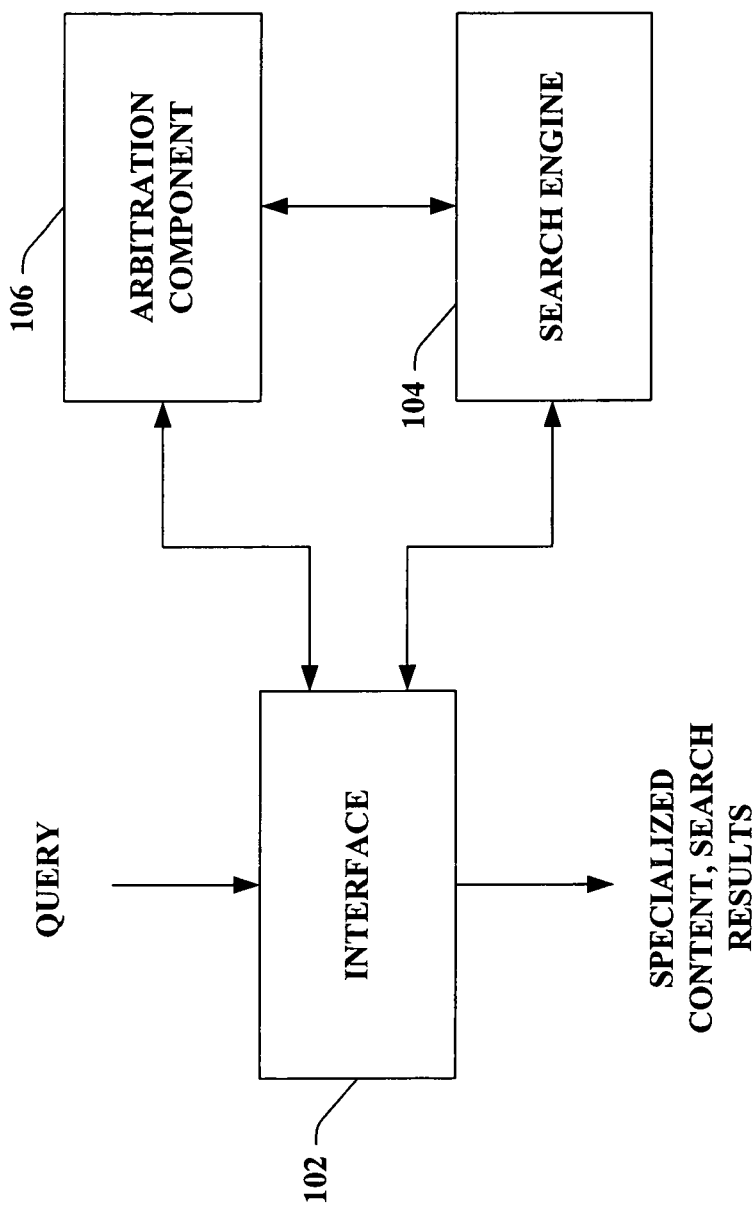
FIG. 1 illustrates a system that facilitates utilizing search results to arbitrate specialized content for presentation to a user, in accordance with various aspects.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Now turning to the figures, FIG. 1 illustrates a system 100 that facilitates utilizing search results to arbitrate specialized content for presentation to a user, in accordance with various aspects. The system 100 can comprise an interface 102 via which a user can initiate a search query. The interface 102 can be operatively coupled to each of a search engine 104 and an arbitration component 106, which can be operatively coupled to each other and which can receive information related to the user query from the interface component 102. Arbitration component 106 can facilitate providing a user with a unique type of specialized content in response to the user's query. For example, with the query "traffic," it can be useful to present up-to-date road traffic conditions in the user's area (e.g., a map of the nearby area including traffic conditions, construction zones, and the like), as well as pointers to relevant pages. According to other examples, user queries that can benefit from specialized content responses can relate to stock names (e.g., wherein specialized content can relate to stock prices, company home page, company information and/or news, . . . ), sports teams (e.g., current scores, schedules, injuries, rosters, . . . ), music artists (e.g., biographies, song titles, photos, top songs, . . . ), current movie names (e.g., titles, actors, local show times, . . . ), popular terms in the news (e.g., relevant news articles, . . . ), etc.

To further this example, the query "traffic" can also be a reference to a music band called Traffic. In such a case, the user is more interested in specialized content related to the band than content related to local traffic conditions. Such specialized content, then, can include photos of the band, hit song titles and/or downloads, top albums, links to trustworthy sites and/or stores that sell songs and/or albums by the band, etc. Intuitively, if search results returned by the search engine 104 comprise predominantly sites about the band, then the music-related specialized content can be deemed more relevant to display than automobile-related traffic results. Thus, the arbitration component 106 can employ various algorithms to utilize search results generated by the search engine 104 to determine when and what type of specialized content to return to the user via the interface 102. Such specialized content can be based at least in part on an assumption that the web reflects a distribution of user interests and that search engine 104 attempts to retrieve a query-relevant snapshot of the web for each query.

Figure 2:
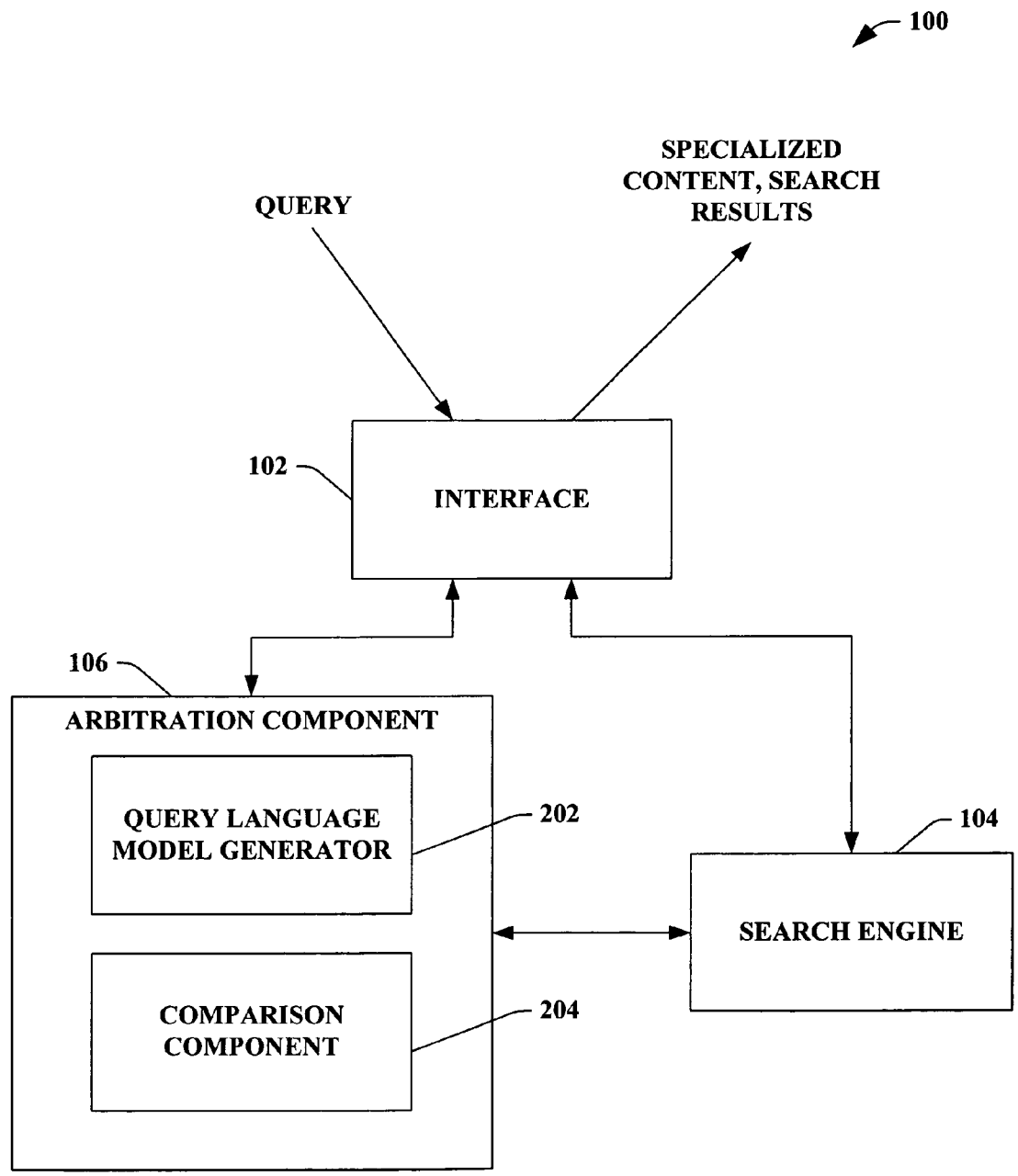
FIG. 2 illustrates a system that facilitates utilizing search results to resolve ambiguity and arbitrate specialized content for returning query results to a user, in accordance with one or more aspects.

FIG. 2 illustrates a system 200 that facilitates utilizing search results to resolve ambiguity and arbitrate specialized content for returning query results to a user, in accordance with one or more aspects. The system 200 comprises an interface 102 that can receive a query from a user and which is operatively associated with each of a search engine 104 and an arbitration component 106. The arbitration component 106 can comprise a query language model generator 202 that generates a query language model comprising information related to keywords in the user's query and the set of search results generated by search engine 104 in response to the user's query, and a comparison component 204 that facilitates comparing the query language model to a reference model to identify specialized content that can be returned to the user to resolve any ambiguity associated with the query. Search result properties can be gleaned by the arbitration component 106 by processing a universal resource locator (URL) associated with a returned web page, a page title, page contents, result snippet(s), or any other suitable information related to properties of the query results generated by the search engine 104.

Once the query language model has been generated, the comparison component 204 can compare it to reference model(s) in order to evaluate relevance of a specialized content topic for the set of web pages returned by search engine 104. Specialized content information related to the query and which exhibits a sufficiently high weight after comparison by the comparison component 204 can be directly presented to the user via the interface 102 (e.g., without the user being required to click on a link to reach the information). Thus specialized content can be presented directly to the user based on inferences (e.g., and/or weights) that indicate that the returned information is that which the user seeks.

For example, a user query related to a specific sports figure can return a large number of results related to the sport associated with the sports figure. It may be that the sports figure shares a name with another person (e.g., a member of a less popular music band) who appears on at least one returned web page. Information related to the returned results can be compared to a specialized content reference model (e.g., a "sports" reference model, a "famous people" reference model, . . . ) to evaluate an aggregate weight for each specialized content topic (e.g., based at least in part on a sum of weight values for words and/or properties associated with the returned pages), which can in turn be employed to infer that the sought information pertains to the most heavily weighted specialized context topic. Specialized content associated with the query in this topic can be returned directly to the user, with or without other result links, to mitigate a need for the user to click on a link comprising the information. Thus, the user can receive information related to the sports figure and not the music figure because the language model associated with the sport topic exhibits a substantially heavier weight than that associated with the music topic.

Figure 3:
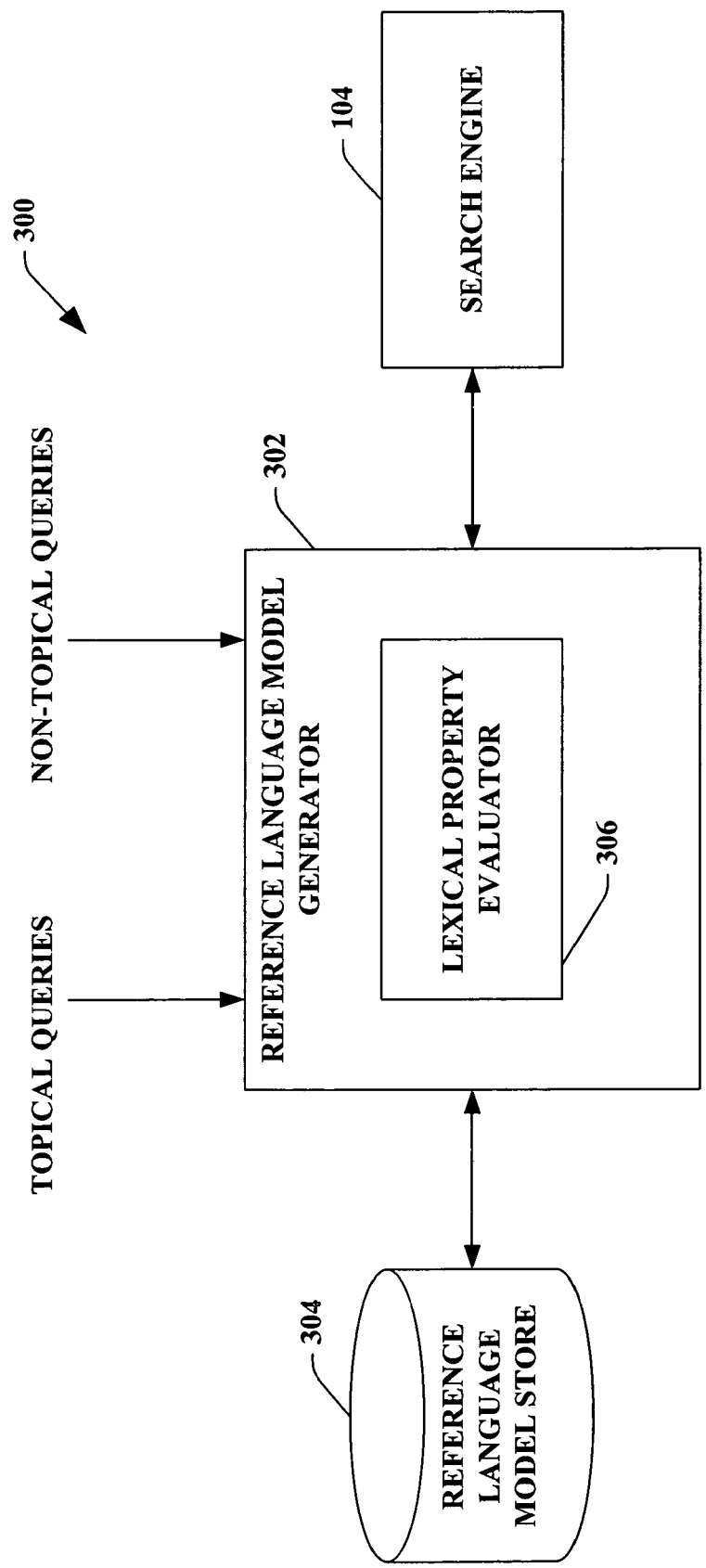
FIG. 3 illustrates a system that facilitates arbitrating specialized content associated with query search results in accordance with one or more aspects set forth herein.

FIG. 3 illustrates a system 300 that facilitates arbitrating specialized content associated with query search results in accordance with one or more aspects set forth herein. The system 300 comprises a search engine 104 that returns web page results in response to a user query, as described with regard to FIG. 1. The search engine is operatively coupled to a reference language model generator 302 that generates reference language models based on a plurality of queries input to the search engine 104. For example, the reference language model generator 302 can receive topical queries (e.g., queries related to a specific topic), as well as non-topical, or general queries to facilitate accumulating a sample data set from which to generate reference language models. The reference language model generator 302 can comprise a lexical property evaluator 306 that assesses a frequency with which words occur in returned results and can weight such words according the frequency of occurrence in response to a given query. Such weights, as well as the reference models generated by the reference language model generator 302, can be stored in a reference language model store 304 (e.g., a data store) for utilization by a comparison component (not shown) to facilitate determining whether/what specialized content information should be presented to a user in response to the user's query.

For example, the reference language model generator 302, in conjunction with lexical property evaluator 306, can evaluate one or more topic-specific queries received by the search engine 104 and/or reference language model generator 302 to determine a frequency with which various words appear in web page titles, snippets, or any other suitable web page properties. Words appearing at high frequencies in specific queries can be weighted more heavily than words appearing at lower frequencies, with regard to those queries. For instance, if a query is related to sports, the word "sports" can be weighted heavily to indicate its relevance. The word "game" can be weighted less heavily than sports, because "game" can apply to non-athletic activities, such as video games, board games, etc., but can still be given a relatively large weight because it is applicable to sports as well. Reference models for various query categories (e.g., sports, music, movies, . . . ) can be stored in the reference language model store 304 for comparison in order to facilitate determining what, if any, specialized content to return to a user.

The lexical property evaluator 306 can facilitate determining lexical properties (e.g., word frequencies, . . . ) associated with snippets of information returned with web results, although it will be appreciated that other information (e.g., non-lexical information) can be employed in conjunction with various aspects described herein, as will be appreciated by one skilled in the art. According to one example, a reference language model can be generated for a plurality of specialized content types (e.g., sports, stock information, music, movies, . . . ). To further this example, specialized content associated with music artists can be considered. Lexical properties such as word frequencies associated with search result snippets for queries containing music artist names can be aggregated offline to generate a language model. Such a reference model can be can be employed to associate high probabilities of relevance to music terms such as, for instance, "song," "artist," "mp3," "band," etc., and can be stored in reference language model store 304.

It will be appreciated that the reference language model store 304 can be a data store that can store various data related to the system 300. The data store can provide storage for reference language models, lexical properties, word frequencies, weights, etc. The data store can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data stores of the subject systems and methods are intended to comprise, without being limited to, these and any other suitable types of memory. In addition, it is to be appreciated that such data stores can be a server, a database, a hard drive, and the like.

Figure 4:
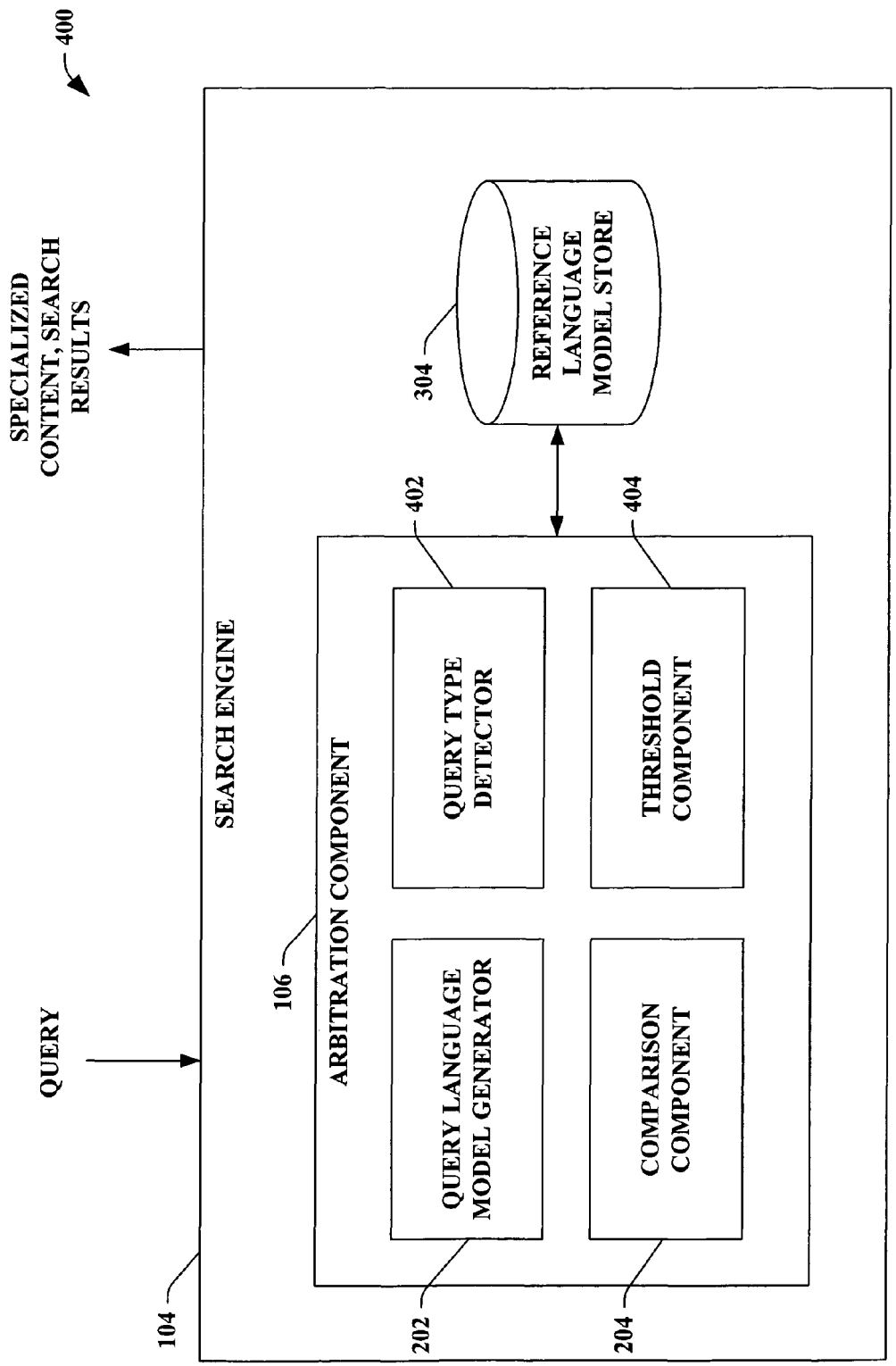
FIG. 4 is an illustration of a system that facilitates specialized content arbitration of returned search result information in accordance with various aspects.

FIG. 4 is an illustration of a system 400 that facilitates specialized content arbitration of returned search result information in accordance with various aspects. The system 400 can comprise a search engine 104 with an arbitration component 106 and a reference language model store that stores reference language models, as set forth with regard to previous figures. The arbitration component 106 can comprise a query language model generator 202, and a comparison component 204. Additionally, the arbitration component 106 can comprise a query type detector 402 that determines what terms in the query match available specific content information (e.g., the name of an athlete present in the sports content, the name of a song present in the music content, a stock symbol for which current quotes are present in the stock content, an event name present in the news content, the name of a disease present in the health content, or any other terms that are present in a suitable category of specialized content). Based on a determination by the query type detector 402, the arbitration component 106 can select the appropriate reference language model from the reference language model store 304 for use by the comparison component 204 in comparing to the query language model generated by query language model generator 202 to evaluate relevance (e.g., based on weighted lexical properties) of returned results returned by search engine 104 for the query.

Additionally, arbitration component 106 can comprise a threshold component 404 that employs a predetermined minimum relevance threshold value to facilitate determining whether a search result is relevant to a user's query. The arbitration component can use a global value for all specialized content topics or a different value for each topic. For instance, a minimum relevance of 50% can be employed in conjunction with weighted lexical properties and/or model comparisons in order to determine whether specialized content should be presented to a user in response to the user's query. In the event that no reference model corresponding to the available specialized content topics satisfies the threshold constraint, no specialized content need be presented to the user, and returned results can be presented normally. However, in the event that one or more particular reference models exceed the threshold relevance value, specialized content associated with the query in the topics with such reference models can be presented directly to the user.

According to an example, a query can be "atomic mass of tungsten." Query type identifier 402 can identify the query as being related to periodic table information, or any other suitable category of information. For instance, the query type identifier can determine that the terms "atomic mass," and/or "tungsten" are relevant to any of the specialized content topics for which models are stored in the reference language model store 304. Results retrieved by the search engine 104 can be analyzed by the query language model generator 202 to create a query-specific snippet-based language model. Comparison component 204 can then compare the query language model to one or more reference models to assess the type(s) of specialized content triggered by the query results. For instance, one or more similarity measures (e.g., cosine similarity, KL-divergence, . . . ) can be utilized to compare query models to reference models, as will be appreciated by those skilled in the art. The arbitration component 106 can then select reference models that are most similar to the query model (e.g., at or above the relevance threshold) and retrieves matching content for display. According to this example, the arbitration component 106 can select a specialized content snippet associated with "tungsten" in the data pertaining to atomic mass in the specialized content for chemistry and the search engine 104 can directly present the snippet (e.g., "The atomic weight of tungsten (symbol W) is 183.85.") and/or a link to a web page providing such information. In one instantiation of this invention, a search result that contains information identical with that stored in the specialized content can be singled out as containing the answer instead or in addition to custom specialized content. In addition, the other returned results can be sorted according to relevance to the determined specialized content topic if desired.

Figure 5:
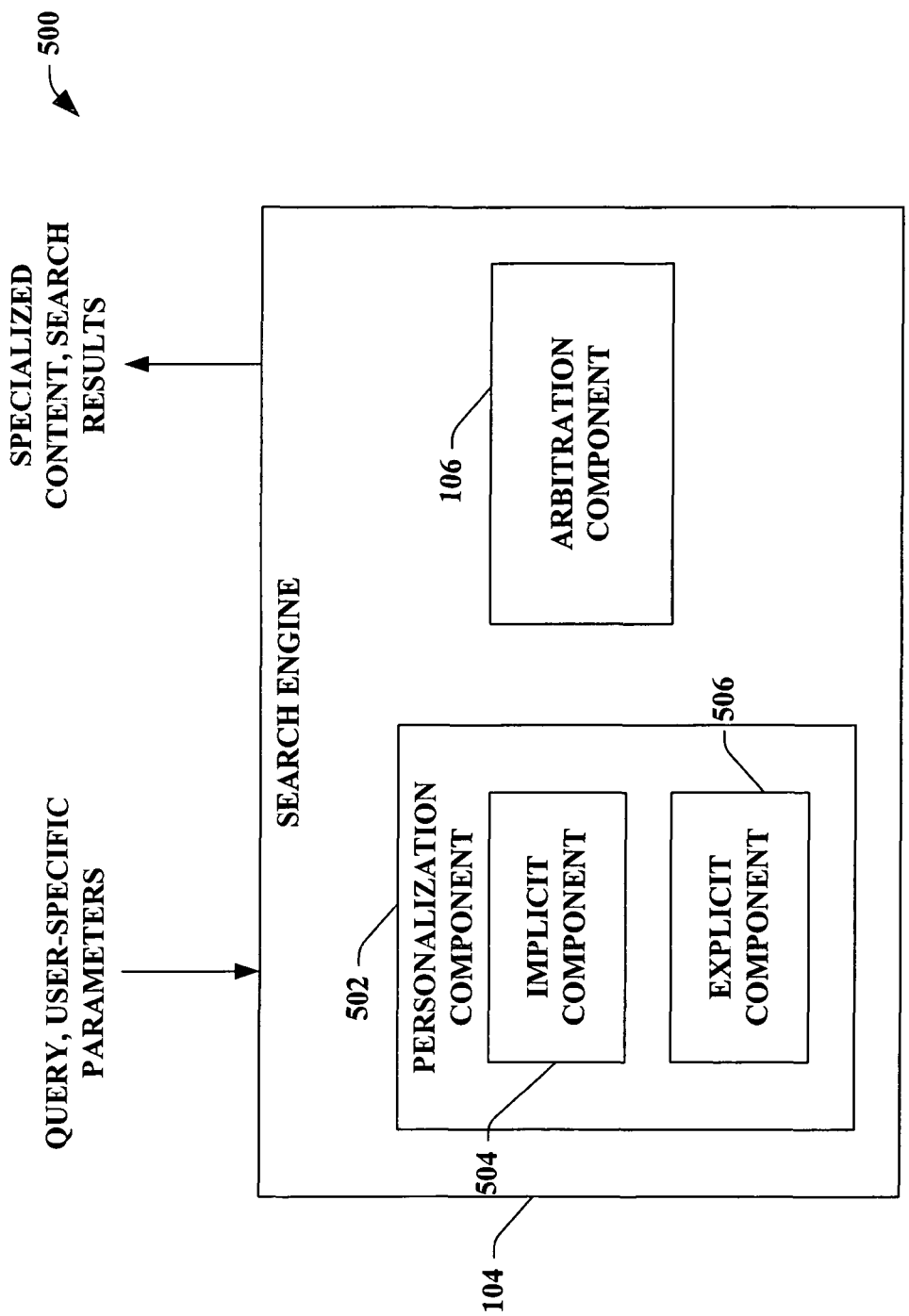
FIG. 5 is an illustration of a system that facilitates personalizing a specialized content provider in a search engine in accordance with one or more aspects.

FIG. 5 is an illustration of a system 500 that facilitates personalizing a specialized content provider in a search engine in accordance with one or more aspects. The system 500 can comprise a search engine 104 that receives user-specific parameters and/or queries. The search engine 104 can comprise an arbitration component 106 that is similar to the arbitration components described with regard to preceding figures. Search engine 104 can additionally comprise a personalization component 502 (e.g., a filter) that facilitates obtaining and/or maintaining user-specific information that can be utilized to adjust relevance parameters, user preferences, and the like. For example, personalization component 502 can comprise an implicit component 504 that receives and/or stores implicit information related to user preferences, such as user query history and the like. Frequent queries for a given subject (e.g., music, sports, stocks, . . . ) can be utilized to lower a relevance threshold associated with that subject. For instance, a threshold for a music category can be lowered for a user who searches often within that category, e.g., if a user's history contains queries such as "led zeppelin", "janis joplin", "jimi hendrix", and "the beatles", then the implicit component 504 can infer that the relevance of music specialized content is higher for future queries for "traffic", "doors", or "kiss", for example.

According to another example, previous queries by a particular user can have included the word "saturn." It can be determined that a majority of the query results selected by the user related to the automobile brand Saturn, while relatively few selected results related to the planet Saturn. In such a scenario, the implicit component 504 can employ user history to infer that specialized content related to Saturn automobiles is more relevant than specialized content related to the planet Saturn, and arbitration component 106 can utilize such information when making a determination to which specialized content to provide, if any, to the user in future queries containing the word "Saturn." The implicit component 504 can thus be trained over time through use, can be employed at the user's computer and/or at a server utilized by the user, and can utilize selected web results and/or query logs (related to the user or to all users searching via the search engine) to implicitly personalize the arbitration system.

Personalization component 502 may further comprise an explicit component 506 that can receive information related to user preferences in order to adjust relevance thresholds and/or lexical property weights. For instance, a user can indicate (e.g., through an interface, a preferences page thereon, . . . ) that the user is interested in certain areas of information over others. To further this example, the user can indicate that movies are more relevant as desired content than are sports. In such a case, explicit component 506 can be employed to adjust relevance thresholds downward for movie-related search results while maintaining and/or increasing relevance thresholds for sports-related results. In this manner, the user can customize the system 500 to facilitate providing the user with specialized content that is most relevant to the user's query. Additionally, the user can be provided with an opportunity to provide feedback indicative of the usefulness of the instant answer, in order to customize the system. For example, a button or icon (or a plurality thereof) can be presented to the user, upon which the user can click to indicate whether the instant answer was or was not useful, depending on the icon/button, etc.

Figure 6:
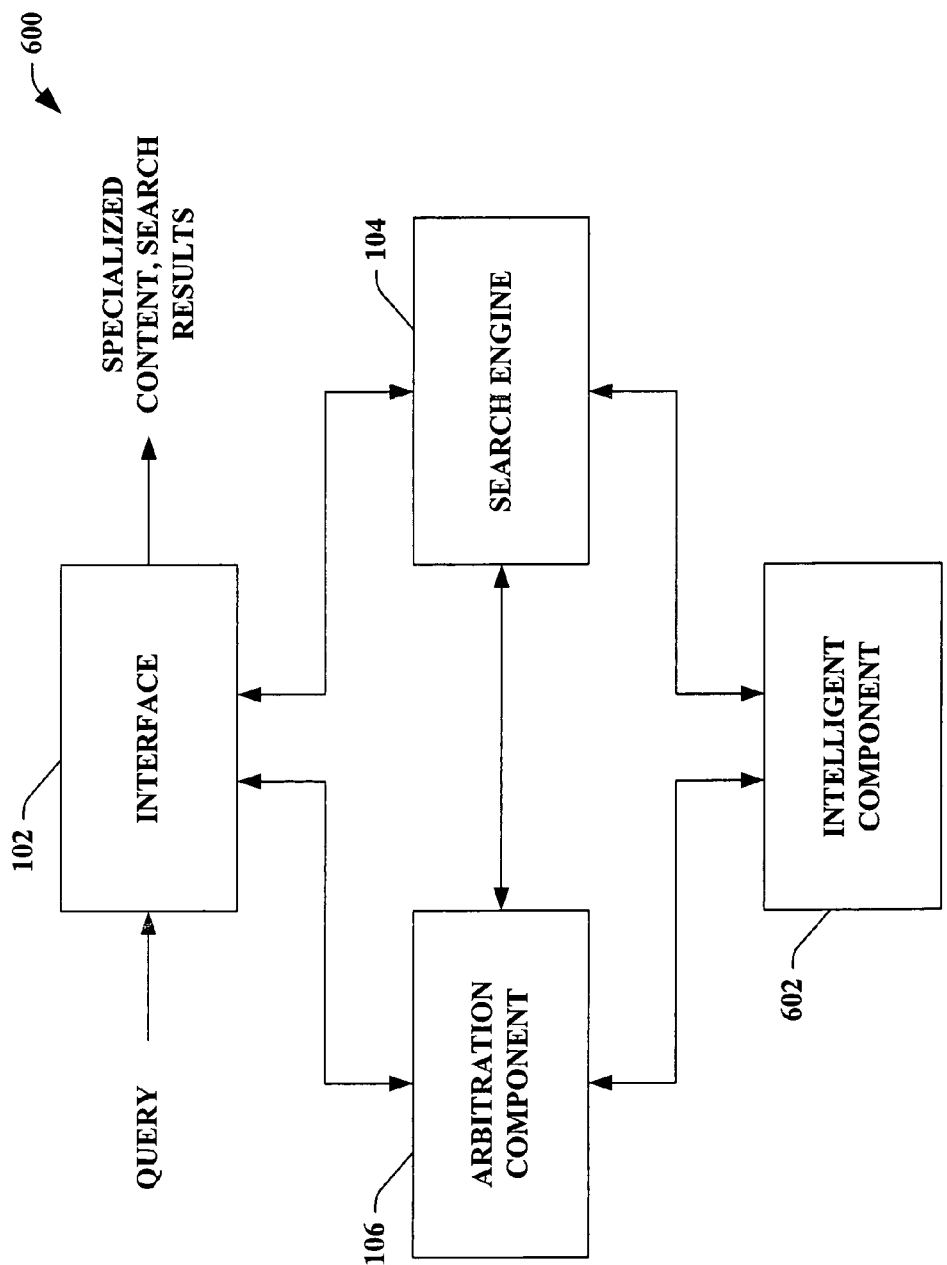
FIG. 6 illustrates a system that facilitates arbitrating specialized content to provide a user with user-desired information in response to a query without requiring the user to click on a link associated with such information, in accordance with various aspects.

FIG. 6 illustrates a system 600 that facilitates arbitrating specialized content to provide a user with user-desired information in response to a query without requiring the user to click on a link associated with such information, in accordance with various aspects. The system 600 can comprise an interface 102 that is operatively coupled to each of a search engine 104 and an arbitration component 106, each of which are coupled to the other. An intelligent component 602 is coupled to both search engine 104 and arbitration component 106, and can make inferences regarding optimization of system performance and the like. The intelligent component 602 can be utilized by the arbitration component 106 to infer that particular specialized content is in fact the content sought by the user. For instance, a user who queries the term "traffic" and has repeatedly selected links related to local highway traffic can be inferred to desire such information in the future. Thus, intelligence component 602 can provide as specialized content information related to traffic delays, accidents, backups, etc., in the user's area. In such a case specialized content is inferred to be the content the user is seeking, and is presented to the user upon a determination that the relevance of given information is above a certain threshold relevance level.

According to another example, intelligent component 602 can infer that a particular news event is of interest to the user and can present such information as specialized content. For instance, if the user is searching "weather" in the user's local area, a flash flood warning issued recently can be inferred to be extremely relevant and can be displayed to the user as specialized content. Similarly, other sorts of topical news events can be inferred to have heightened relevance in order to facilitate displaying such news events to a user.

It is to be understood that the intelligent component 602 can facilitate reasoning about or inferring states of the system, environment, and/or user from a set of observations as captured via events and/or data. Inference can be employed to identify a specific context or action, or can generate a probability distribution over states, for example. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, . . . ) can be employed in connection with performing automatic and/or inferred action in connection with the claimed subject matter.

A classifier is a function that maps an input attribute vector, $x=(x=(x1, x2, x3, x4, xn)$, to a class label class(x). A classifier can also output a confidence that the input belongs to a class, that is, $f(x)=confidence(class(x))$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs that splits in an optimal way the triggering input events from the non-triggering events. Intuitively, this makes the classification correct for testing data that is identically distributed to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority. Such classification schemes can be utilized by the subject systems and/or methods to facilitate inferring states and/or actions to adjust content relevance and/or to display specialized content to a user.

Figure 7:
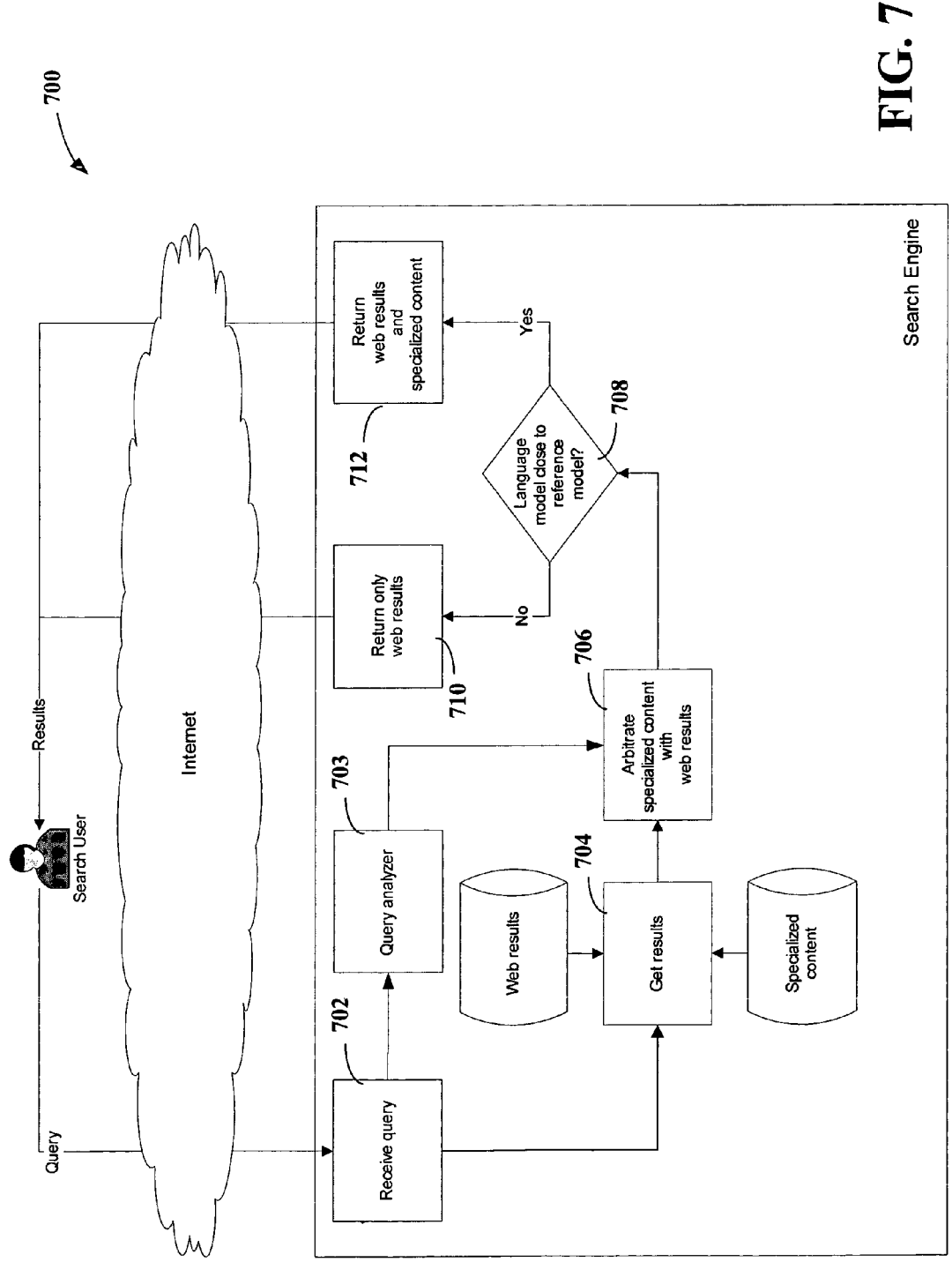
FIG. 7 is an illustration of a method that facilitates providing specialized content to a user upon a determination that content relevance is at or above a threshold relevance level, in accordance with one or more aspects described herein.
Figure 8:
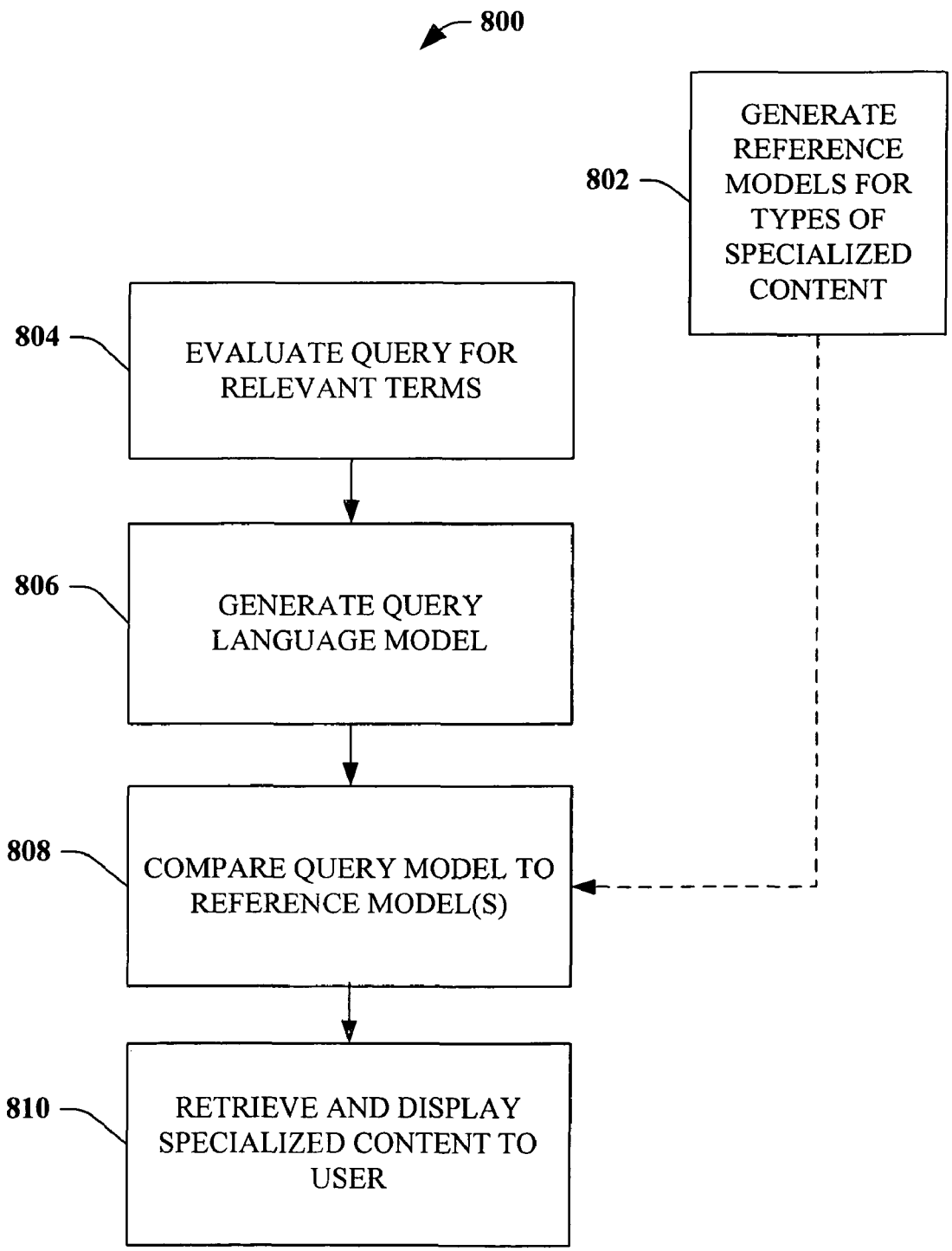
FIG. 8 illustrates a methodology providing specialized content to a user in response to a query to mitigate superfluous web navigation for the user in accordance with one or more aspects.
Figure 9:
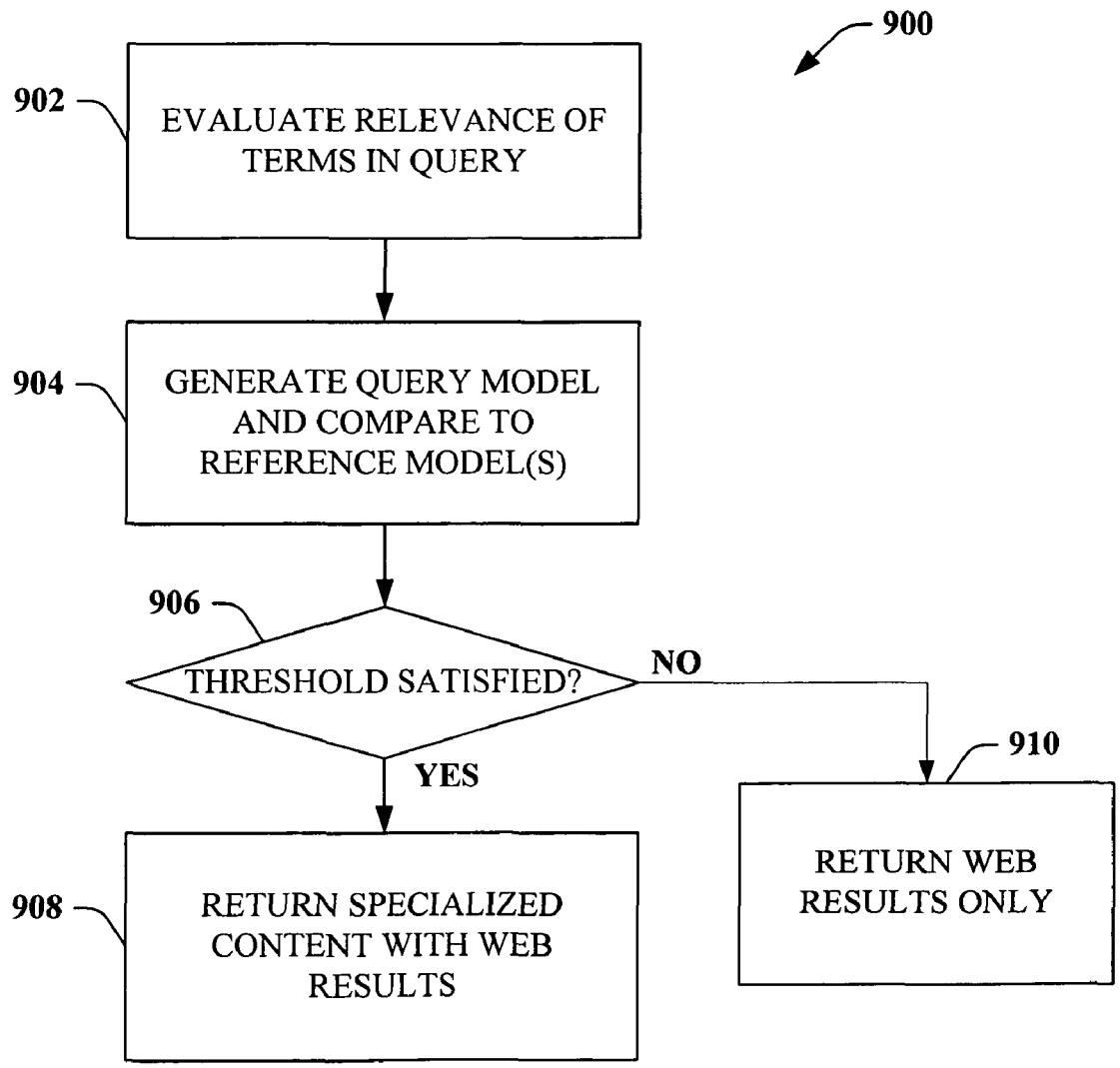
FIG. 9 illustrates a methodology for determining whether to display specialized content to a user based on a dynamically adjustable relevance threshold, in accordance with various aspects.

FIGS. 7-9 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

FIG. 7 is an illustration of a method 700 that facilitates providing specialized content to a user upon a determination that content relevance is at or above a threshold relevance level, in accordance with one or more aspects described herein. The method 700 is depicted as occurring in a search engine, although such can be performed on a user's computer (e.g., a PC, a laptop, a cell phone, a handheld communication device, a handheld computing device, a PDA, . . . ). A user can submit a query via the Internet, which can be received by the search engine at 702. The search engine can return results for the query at 704, and such results can comprise web page results as well as specialized content (e.g., information extracted from textual snippets associated with the web pages, URL and/or hyperlinks associated therewith, . . . ). At 706, web results and specialized content can be arbitrated (e.g., based in part on generation of a query language model comprising lexical properties, weights, etc., as set forth herein). A query analyzer module 703 can first determine whether specific terms in the query are relevant for one or more specialized content topics, and then an arbitration protocol can determine whether or not to make specialized content associated with such search terms directly available to the user.

At 708, a determination can be made regarding whether a query language model is sufficiently similar to one or more pre-generated reference language models. For instance, a threshold similarity level (e.g., relevance level) can be employed to evaluate whether lexical properties such as weighted words and the like are represented at a frequency above the threshold level. If the models are not sufficiently similar, then at 710, web results returned by the search engine in response to the query can be displayed to the user. If the models exhibit similarity at or above the threshold level, then at 712, specialized content can be returned to the user in addition to the web results, in order to provide the user reliable information and spare the user from having to click and/or scroll through web search results.

In accordance with various aspects of the method 700, properties of a current set of search results can be compared to a set of pre-specified properties (reference model) relevant for individual types of specialized content. Such properties can be obtained by processing the URL, page titles, page contents, snippets of the results, etc. In this case, arbitration facilitates selecting an appropriate type of specialized content. In other cases, arbitration can be used to determine that no useful specialized content is relevant to the current set of search results, and thus no specialized content need be shown along with the regular search results. Moreover, the search results used in the model need not be limited to web results. Arbitration can utilize other types of search results, such as news results. For example, a web search engine presented with the query "brown sunglasses" will commonly retrieve results about eyeglasses. If a song called "brown sunglasses" is just released and becomes popular overnight, the web results may not have enough time to build up a popularity score there for (e.g., to properly weight the words "brown sunglasses." In this case, the search results provided by a news search engine for the query "brown sunglasses" can be more useful for query intent disambiguation, as they will relate primarily to the new song, the public's reaction to it, etc.

FIG. 8 illustrates a methodology 800 providing specialized content to a user in response to a query to mitigate superfluous web navigation for the user in accordance with one or more aspects. At 802, a plurality of reference models can be generated and stored based at least in part on a pool of queries received by a search engine. Such queries can be specific to the user or can be queries from multiple users. The reference language models can be generated and updated offline, at predetermined intervals, for a plurality of types of specialized content (e.g., music, sports, news, politics, movies, or any other suitable or desired topic). According to an example, lexical properties, such as word frequencies in snippets associated with specialized content for music artists can be aggregated offline into a reference language model. In another example, the reference language model for music can be obtained from word frequencies in snippets of web results retrieved by a search engine when querying music artist names. This "reference model" can associate high probability to music terms such as "song", "artist", "mp3", "band", etc.

When a query is submitted to the search engine, the query can be evaluated at 804 to determine whether it contains terms relevant to any of the specialized content types (e.g., music, stock quotes, automobile traffic, sports scores, etc.). For example, the query "traffic empty pages" contains the term "traffic", which can be relevant both for the music specialized content and the automobile traffic specialized content. Web search results retrieved for the given query can then be analyzed to create a query-specific snippet-based language model, at 806. Other types of models can also be generated based on the different types of specialized content available.

At 808, the query language models can be compared with the reference models, which can be retrieved from storage for comparison, for the types of specialized content that were triggered. Various similarity measures, such as cosine similarity and KL-divergence (also known as relative entropy), can be used to compare the models, as will be understood by those skilled in the art. An arbitration protocol can then select the most similar reference models that are within a similarity threshold to the query language models and can retrieve the matching content to be displayed, at 810. In the "traffic empty pages" example, specialized music content for the band "Traffic" (and maybe a direct link to the song "Empty Pages") along with the web search results, upon a determination that the term "traffic" is more relevant to music than to automobile traffic. Such a determination can be based on user query history, user result selection, explicit user indication, and the like.

FIG. 9 illustrates a methodology 900 for determining whether to display specialized content to a user based on a dynamically adjustable relevance threshold, in accordance with various aspects. At 902, query terms can be evaluated for relevance weight, as set forth with regard to preceding figures. At 904, query model(s) can be generated based at least in part on weighted lexical properties, and can be compared to predetermined reference language models to determine similarities there between. At 906, a determination can be made regarding whether sufficient similarity exists between a query model and a reference model to warrant displaying specialized content associated with the reference model to a user. Such determination can be made based on a minimum similarity threshold value (e.g., 30% similar, 50% similar, 67% similar, . . . ) and such threshold value can be adjustable upon an occurrence of certain events.

For example, the threshold value can be implicitly adjusted up or down depending on user query history, an event such as a breaking news story, a severe weather warning, or the like. Additionally and/or alternatively, the user can explicitly adjust the threshold. For example, a user (and/or the user's query history) can indicate that music and sports are preferred over politics, such that in a scenario where the user searches "John Smith" and such name relates to a prominent sports figure as well as a prominent politician, a relevance threshold for sports content can be lowered while a threshold for political content can be raised to facilitate filtering out special content related to John Smith the politician while relaxing relevance rules for John Smith the athlete. In such a manner, the method 900 can facilitate personalization of a specialized content arbitration protocol to provide a more robust web-searching experience for the user.

If models exhibit similarity at or above the threshold level at 906, then at 908, specialized content can be displayed to the user in addition to web results returned by a search engine. If, at 906, the threshold constraint has not been satisfied, then at 910, the returned web results can be displayed to the user without specialized content. Thus, the method 900 facilitates determining whether to display specialized content to a user, and if so, what content to display.

Figure 10:
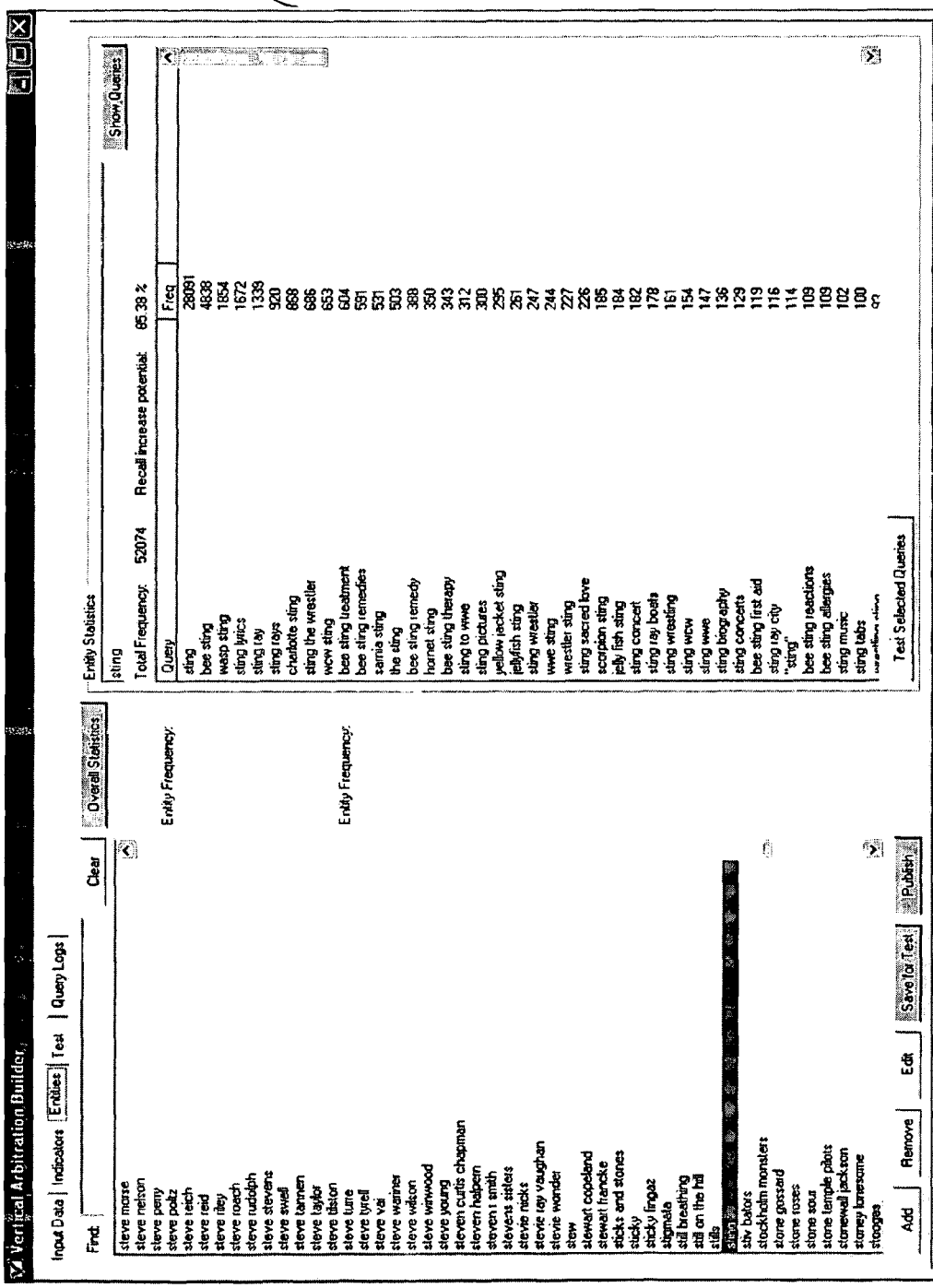
FIG. 10 is an illustration of a screenshot depicting information related to vertical arbitration entities, in accordance with various aspects described herein.

FIGS. 10-13 illustrate screenshots of an implementation of a system for building reference models and determining appropriate similarity measures and thresholds, and depict various aspects associated with the systems (FIGS. 1-6) and/or methodologies (FIGS. 7-9) set forth herein. Referring now to FIG. 10, an illustration is provided of a screenshot 1000 depicting information related to specialized content entities, in accordance with various aspects described herein. The screenshot 1000 shows a partial list of music entities for which specialized content is available and thus, can trigger the display of instant information to a user when they are present in the user's query. For a particular entity (e.g., "sting" is highlighted in the screenshot 1000), the system provides a listing of most-frequent queries in a query log that contains the entity (these can be used for training and testing purposes).

Figure 11:
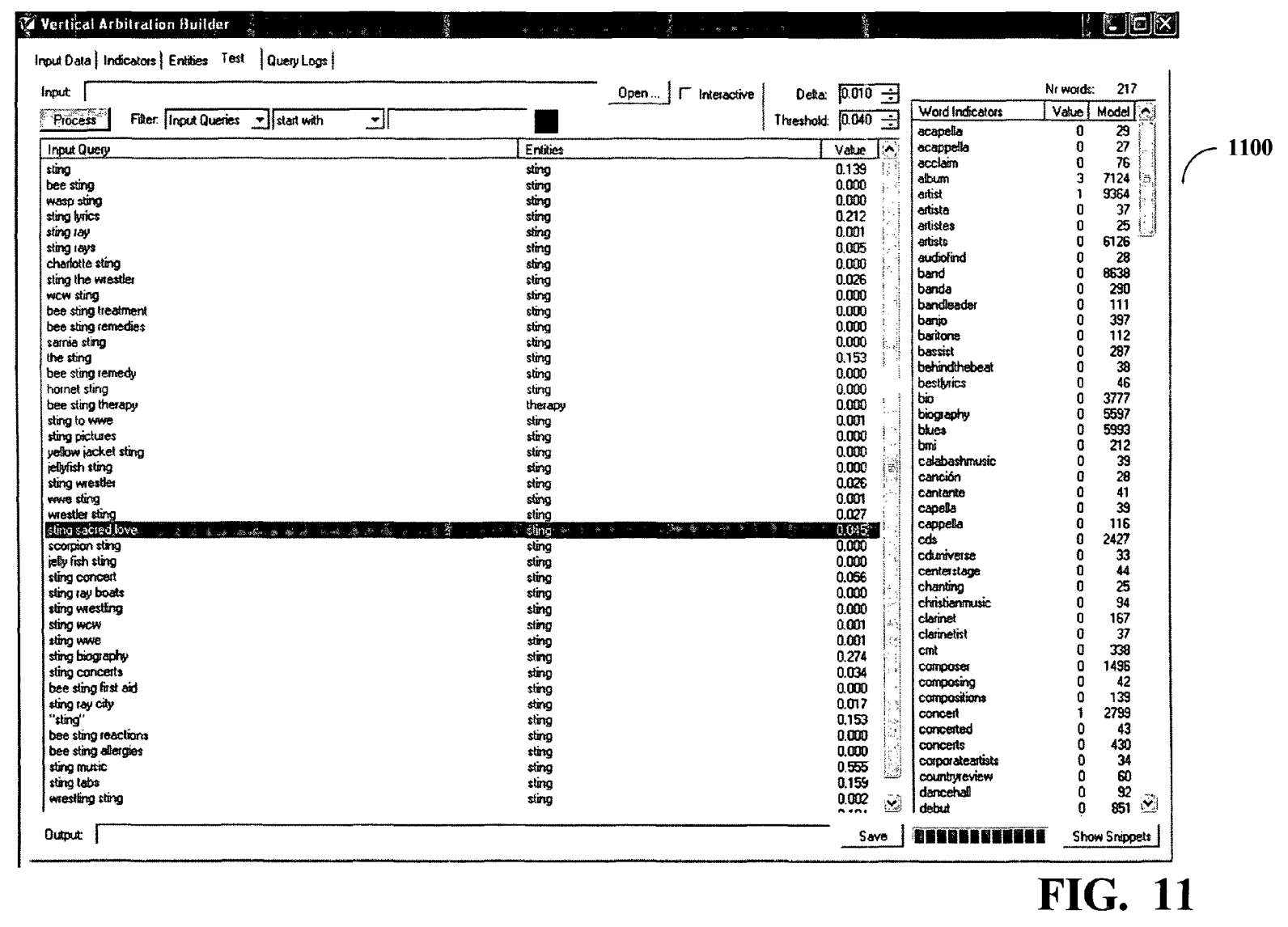

FIG. 11 is an illustration of a screenshot 1100 depicting information related to arbitration results for queries containing the word or entity "sting," as well as a portion of a music reference model, composed of arbitration indicator words. For a given query, (e.g., "sting sacred love," which can be construed to related to the musical artist Sting's song entitled "Sacred Love"), the arbitration results show counts associated with indicator words in the top ten snippets associated there with (e.g., album, artist, concert, . . . ).

Figure 12:
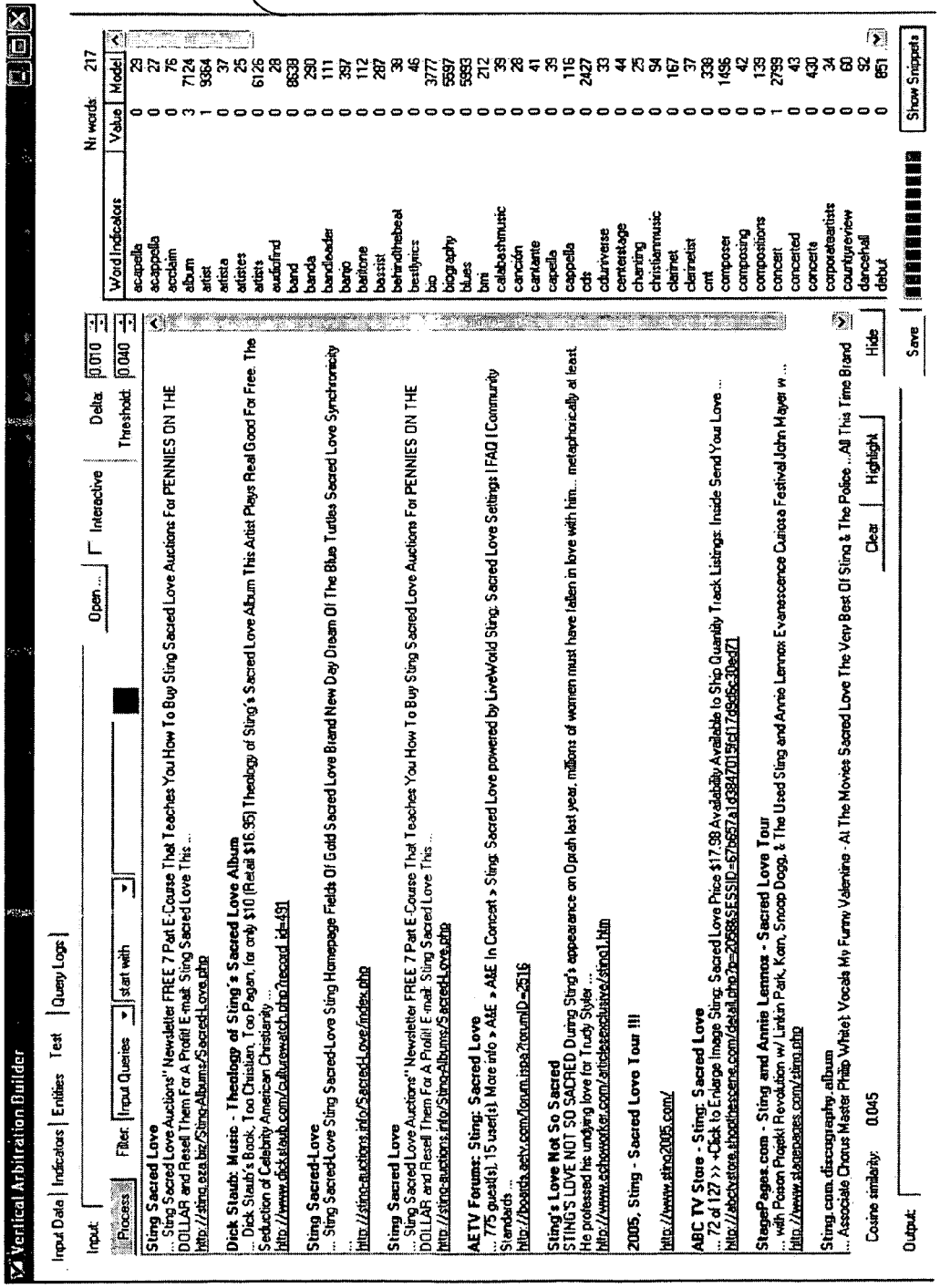
FIG. 12 is an illustration of a screenshot depicting arbitration snippets, in accordance with various aspects.

FIG. 12 is an illustration of a screenshot 1200 depicting arbitration snippets, in accordance with various aspects. Such snippets, in this particular example, show the actual top search results for the query "sting sacred love" with entity and indicator words highlighted in the snippets in screenshot 1200. Such indicator words and/or entities can be employed in conjunction with the various systems and/or methods described herein to facilitate determining whether to display specialized content to a user, and if displaying such content, what specific content to display.

Figure 13:
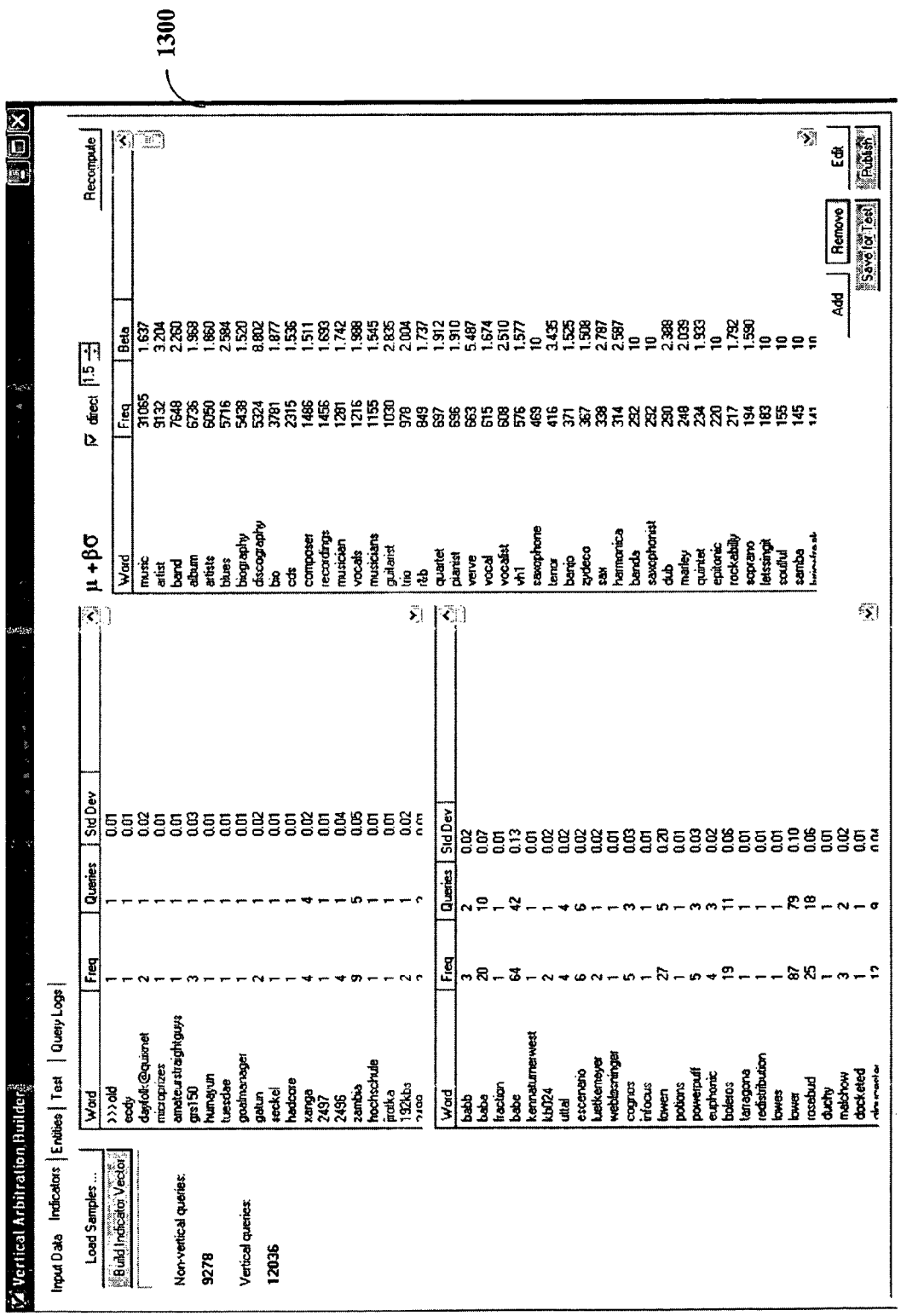
FIG. 13 is an illustration of a screenshot depicting the information related to arbitration indicators, in accordance with one or more aspects.

FIG. 13 is an illustration of a screenshot 1300 depicting the information related to the generation of the reference language model, in accordance with one or more aspects. For example, desired word indicators can be relative to a particular domain, or topic (e.g., music), can be extracted. Samples of search queries and/or music queries can be analyzed, and word occurrence statistics can be computed from retrieved snippets associated with query results. A list of words exhibiting higher occurrence frequencies in music query results than in generic search results can be generated by using, for instance, mean and standard deviations of the occurrences in the two types of queries. In this manner, words can be weighted to facilitate model generation, arbitration, similarity evaluation, etc., as detailed above with regard to the systems and methods described herein.

Figure 14:
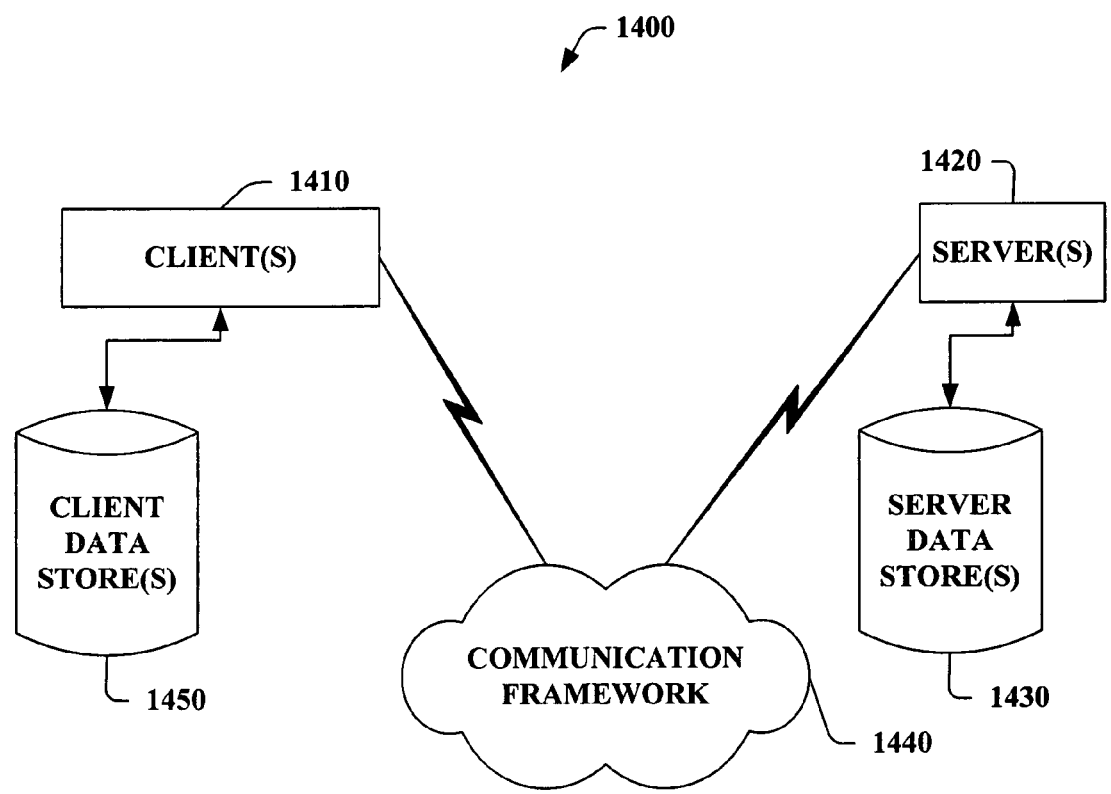
FIG. 14 illustrates an exemplary networking environment, wherein the novel aspects of the claimed subject matter can be employed.
Figure 15:
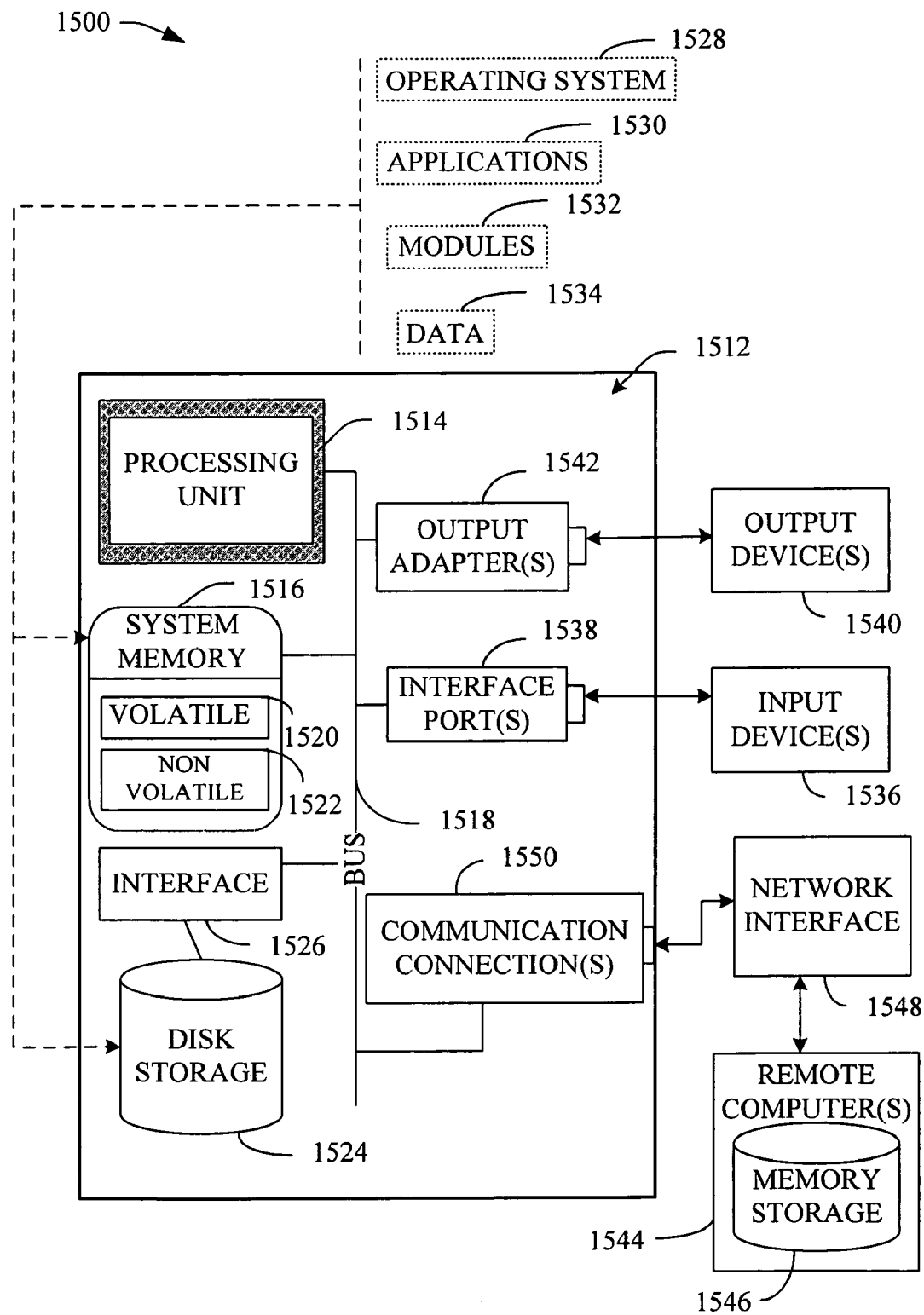
FIG. 15 illustrates an exemplary operating environment that can be employed in accordance with the claimed subject matter.

In order to provide additional context for implementing various aspects of the claimed subject matter, FIGS. 14-15 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 14 is a schematic block diagram of a sample-computing environment 1400 with which the claimed subject matter can interact. The system 1400 includes one or more client(s) 1410. The client(s) 1410 can be hardware and/or software (e.g., threads, processes, computing devices). The system 1400 also includes one or more server(s) 1420. The server(s) 1420 can be hardware and/or software (e.g., threads, processes, computing devices). The servers 1420 can house threads to perform transformations by employing the subject innovation, for example.

One possible communication between a client 1410 and a server 1420 can be in the form of a data packet adapted to be transmitted between two or more computer processes. The system 1400 includes a communication framework 1440 that can be employed to facilitate communications between the client(s) 1410 and the server(s) 1420. The client(s) 1410 are operatively connected to one or more client data store(s) 1450 that can be employed to store information local to the client(s) 1410. Similarly, the server(s) 1420 are operatively connected to one or more server data store(s) 1430 that can be employed to store information local to the servers 1420.

With reference to FIG. 15, an exemplary environment 1500 for implementing various aspects of the claimed subject matter includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCT), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable programmable ROM (EEPROM), or flash memory. Volatile memory 1520 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1512 also includes removable/non-removable, volatile/non-volatile computer storage media. FIG. 15 illustrates, for example a disk storage 1524. Disk storage 1524 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used such as interface 1526.

It is to be appreciated that FIG. 15 describes software that acts as an intermediary between users and the basic computer resources described in the suitable operating environment 1500. Such software includes an operating system 1528. Operating system 1528, which can be stored on disk storage 1524, acts to control and allocate resources of the computer system 1512. System applications 1530 take advantage of the management of resources by operating system 1528 through program modules 1532 and program data 1534 stored either in system memory 1516 or on disk storage 1524. It is to be appreciated that the claimed subject matter can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device 1540. Output adapter 1542 is provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer implemented system that facilitates providing specialized content to a user in response to a user query, comprising:
   a computing device with a processor and a memory, the computing device including:
   a reference language model pre-generated and created by evaluating two or more previous queries to accumulate: 1) a sample data set that includes a topic, and 2) a respective portion of specialized content extracted from content related to a search result from at least one previous query, the sample data set and the respective portion of specialized content are generated based on a frequency of at least one of a key word or a topic within the lexical property evaluation of the previous queries;
   an interface component by which a user enters a query and receives returned data associated with at least one search result from a search engine based on the query;
   a component that creates a query language model that is a set of data generated by evaluating a lexical property of the query received by a computer implemented system or a lexical property of a web search result for the query received by a computer implemented system wherein the query language model is created based upon information gleaned from results from the search engine in response to the user query, the information including at least one of a universal resource locator (URL) associated with a returned web page, a web page title, a portion of web page content, or a result snippet; and an arbitration component that automatically and directly returns the portion of specialized content to the user based upon a determination that a correlation above a threshold of relevance exists between the query language model and the pre-generated reference language model wherein specialized content is content, other than Web pages, that is derived from specialized data feeds and wherein the arbitration component uses a query processing component that identifies whether the query contains two or more terms relevant to at least one of a plurality of specialized content topics associated with the reference language model, such relevancy is utilized for identifying the correlation;

the portion of specialized content is inferred from a portion of a previous query that has a pre-defined word frequency in comparison to the received query, the portion of specialized content is identified from the pre-generated reference model; and the portion of specialized content is populated into at least one search result associated with the user's query based upon the correlation being above the threshold.

2. The system of claim 1, in which the arbitration component comprises:

a language model generator that builds the query language model based on a set of search results returned from a search engine in response to the user query, wherein the set of search results is evaluated to identify a topic a majority of the search results relate;

at least one reference language model for each sample data set, the sample data set is generated based upon at least one of a previous topical query, a previous non-topical query, or a previous general query;

the reference language model is generated based upon aggregating at least one of a lexical property of such previous queries or a word frequency within such previous queries; and a comparison component that identifies and evaluates a similarity between at least one reference language model and the query language model, the similarity is measured by at least one of a cosine similarity or a KL-divergence.

3. The system of claim 2, further comprising:

a threshold component that determines whether the similarity between the query language model and at least one of the reference language model is above the threshold for the identified topic, wherein the portion of specialized content having the pre-defined threshold frequency occurrence within the identified topic is directly pushed to the user if the similarity is above the threshold; and a portion of specialized content is not directly pushed to the if the similarity is below the threshold.

4. The system of claim 1, further comprising a personalization component that adjusts at least one the threshold for the portion of specialized content based at least in part on at least one user preference.

5. The system of claim 4, further comprising an implicit component that adjusts the threshold based on one or more implicit user preferences.

6. The system of claim 5, wherein the one or more implicit user preferences are determined from a user query history or a user query log.

7. The system of claim 4, further comprising an explicit component that adjusts the threshold based on one or more explicit user preferences related to at least one preferred specialized content topic.

8. A computer-implemented method that facilitates providing specialized content to a user, comprising:

operating a processor with a coupled memory;

identifying at least one term in a user query as being related to at least one specialized content topic, the specialized content topic is determined based upon a lexical analysis of a plurality of previous queries in which a portion of the specialized content topic is categorized into at least one reference language model;

extracting a portion of specialized content from a search result from at least one reference language model, the portion of specialized content is a portion of a previous query result having a pre-defined word frequency in connection with the user query wherein specialized content is content, other than Web pages, that is derived from specialized data feeds;

generating a query language model upon receipt of returned search results for a user query, the query language model is generated based upon at least one of a lexical property of the user query or a property of at least one search result;

generating the at least one reference language model for each of a plurality of query topics wherein generating the at least one reference language model comprises:

analyzing returned results for a plurality of topic-specific queries where topic-specific queries are queries related to a specific topic;

analyzing returned results for a plurality of general queries where general queries are queries not related to the specific topic; and weighting words that occur with a higher frequency in the topic-specific queries than in the general queries;

comparing the query language model to the at least one reference language model corresponding to the specialized content topic related to a portion of terms in the user query;

determining whether a similarity between the query language model and the at least one reference language model is equal to or above a relevance threshold value; and automatically displaying the portion of specialized content from the at least one reference language model with a search result for the user query if the determined similarity is equal to or above the relevance threshold value.

9. The method of claim 8, further comprising displaying returned search results without specialized content if the relevance threshold value is not met or exceeded.

10. The method of claim 8, further comprising arbitrating between topics for which the relevance threshold value is equaled or exceeded to display specialized content associated with at least one of these topics.

11. The method of claim 10, further comprising arbitrating between specialized content snippets within a topic associated with topical terms in the query by evaluating an aggregate weight for each specialized content snippet.

12. The method of claim 8, further comprising implicitly adjusting the relevance threshold value for a given query topic based at least in part on user query history.

13. The method of claim 8, further comprising explicitly adjusting the relevance threshold value for a given query topic based at least in part on one or more user-indicated preferences.

14. A computer-implemented system that facilitates providing specialized content to a user in response to a query, comprising:

at least one computing device with a processor and a memory, the at least one computing device including:

means for receiving a user query;

means for generating at least one query result for the user query;

means for identifying terms in the user query as being related to a particular topic, the relation is a query language model;

means for comparing a property in the user query result and a property in a previous query to a specialized content reference model in order to produce an aggregate weight for each specialized content topic within the specialized content reference model;

means for generating the specialized content reference model for each of a plurality of query topics wherein the specialized content reference model comprises:

means for analyzing returned results for a plurality of topic-specific queries where topic-specific queries are queries related to a specific topic;

means for analyzing returned results for a plurality of general queries where general queries are queries not related to the specific topic; and means for weighting words that occur with a higher frequency in the topic-specific queries than in the general queries;

means for utilizing the aggregate weight for each specialized topic to identify a portion of specialized content within the reference model for the user query, the portion of specialized content is inferred from a portion of a previous query that has a pre-defined word frequency in comparison to the received user query wherein specialized content is content, other than Web pages, that is derived from specialized data feeds;

means for determining whether the portion of specialized content associated with the user query is above a relevance threshold;

means for automatically embedding the portion of specialized content in the at least one query result based upon whether the portion of specialized content is above the relevance threshold; and means for displaying the portion of specialized content to the user upon a determination that the portion of specialized content is above the relevance threshold.

15. The system of claim 14, further comprising means for adjusting the relevance threshold in response to one or more user preferences.

16. The system of claim 14, further comprising means for adjusting the relevance threshold as a function of at least one of an explicit indication of relevance to a user or an inferred relevancy that is based on a query history associated with a user.

* * * * *